United States Patent

Susnjara et al.

[11] Patent Number: 6,061,865
[45] Date of Patent: May 16, 2000

[54] DUST COLLECTOR ASSEMBLY FOR CNC ROUTER MACHINES

[75] Inventors: Kenneth J. Susnjara, Birdseye; Michael P Hardesty, Dale; Robert A. Hardy, Gentryville, all of Ind.

[73] Assignee: Thermwood Corporation, Dale, Ind.

[21] Appl. No.: 09/136,762

[22] Filed: Aug. 19, 1998

[51] Int. Cl.[7] .................................. A47L 5/00; B26D 7/18
[52] U.S. Cl. .............................. 15/301; 15/339; 15/312.1; 83/100
[58] Field of Search ................ 15/301, 303, 312.1, 15/339; 83/100

[56] References Cited

U.S. PATENT DOCUMENTS

| | | | |
|---|---|---|---|
| 3,880,047 | 4/1975 | Dosier | 83/100 |
| 4,864,679 | 9/1989 | Briner | 15/339 |
| 5,159,737 | 11/1992 | Kimura et al. | 15/312.1 |

*Primary Examiner*—Terrence R. Till
*Attorney, Agent, or Firm*—Lalos & Keegan

[57] ABSTRACT

A dust collector assembly for a toolhead assembly of a machine tool, having a base unit, a bracket supported on the base unit and pivotal relative thereto about a first axis and a tool unit supported on the bracket and pivotal relative thereto about a second axis, generally consisting of a first duct member supported on the base unit, having an inlet and an outlet communicable with a vacuum producing source; a second duct member supported on the bracket, having an inlet and an outlet communicating with the inlet of the first duct member through a first slip ring connection disposed coaxially with the first axis; and third duct supported on the bracket, having an inlet disposed adjacent a tool of the tool unit and an outlet communicating with the inlet of the second duct through a second slip ring connection disposed coaxially with the second axis.

10 Claims, 4 Drawing Sheets

DUST COLLECTOR ASSEMBLY FOR CNC ROUTER MACHINES

This invention relates to a dust collector assembly and more particularly a dust collector assembly for 5-axis CNC machine tools.

BACKGROUND OF THE INVENTION

Computer numerically controlled machines commonly used in the woodworking, plastics and aerospace industries for routing, shaping, drilling, sawing, chiseling and sanding or otherwise finishing workpieces typically are equipped with tools which may be traversed along a number of axes or traversed and rotated along or about a number axes. Those machines in which the tool may be traversed along orthogonal or x ,y or z-axes commonly are referred to as 3-axis machines, and those in which the tool may be both traversed along orthogonal axes and rotated about two additional axes displaced 90° apart commonly are referred to as 5-axis machines. 3-axis machines typically are used for machining flat workpieces such as tabletops, door panels and the like, and 5-axis machines typically are used for trimming workpieces of more complex three-dimensional configurations such as molded plastic housings and the like.

Both of such types of machines also are usually provided with dust collector assemblies which function to remove dust and other particles from the vicinity of the cutting tool. The design, manufacture and installation of such assemblies for 3-axis machines is relatively simple due to the more limited degrees of movement of the cutting tool. Because of the number of additional degrees of movement of the cutting tool in 5-axis machines, the design, manufacture and installation of such assemblies is more complicated and difficult.

It thus is the principal object of the present invention to provide a novel dust collector assembly for a 5-axis machine which is simple in design, comparatively inexpensive and easy to manufacture and install, highly effective in performance and durable in service.

SUMMARY OF THE INVENTION

The present invention provides a dust collector assembly for a toolhead assembly of a machine tool, having a base unit, a bracket supported on the base unit and pivotal relative thereto about a first axis and a tool unit supported on the bracket and pivotal relative thereto about a second axis, generally consisting of a first duct supported on the base unit, having an inlet and an outlet communicable with a vacuum producing source; a second duct supported on the bracket, having an inlet and an outlet communicating with the inlet of the first duct through a first slip ring connection disposed coaxially with the first axis; and a third duct supported on the bracket, having an inlet disposed adjacent a tool of the tool unit and an outlet communicating with the inlet of the second duct through a second slip ring connection disposed coaxially with the second axis.

DESCRIPTION OF THE PREFERRED EMBODIMENT OF THE INVENTION

Figure 1:
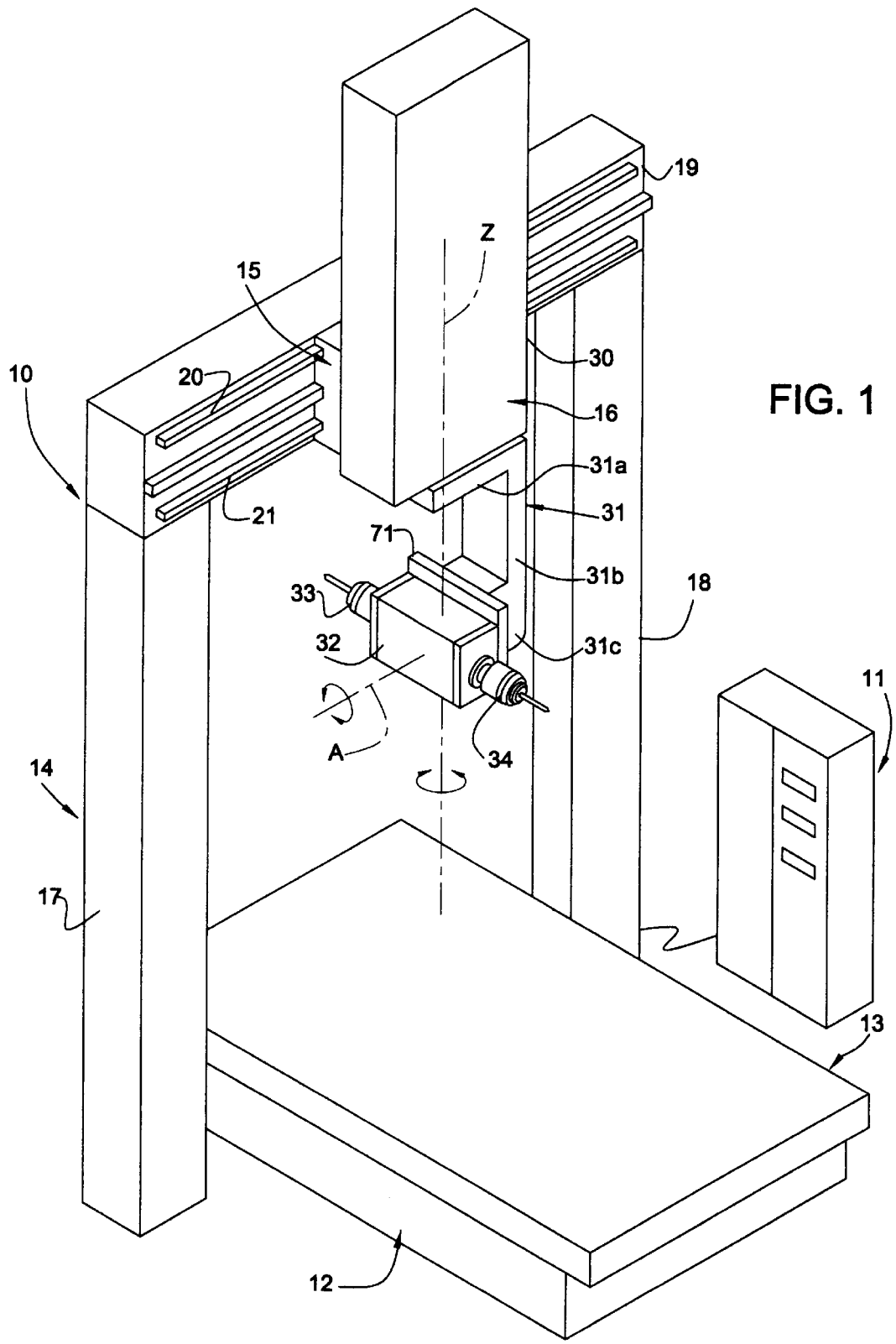
FIG. 1 is a perspective view of a 3-axis CNC router machine unequipped with any dust collector assembly.

Referring to FIG. 1 of the drawings, there is illustrated a 5-axis CNC router machine 10 which is operated by a controller 11. The machine generally includes a base member 12, a worktable 13 supported on the base member, a gantry 14, a toolhead support assembly 15 supported on the gantry and a toolhead assembly 16 supported on the toolhead support assembly. Worktable 13 is mounted on a pair of longitudinally disposed, transversely spaced guideways for displacement longitudinally or along an x-axis. Gantry 14 includes a pair of leg sections 17 and 18 disposed astride base member 12 and a transverse bridge section 19 spanning the upper ends of the leg sections. Toolhead support assembly 15 is supported on a set of transversely disposed guideways 20 and 21 provided on bridge section 19 for displacement transversely along an y-axis. Toolhead assembly 16 similarly is supported on a pair of transversely spaced, vertically disposed guideways on support assembly 15 for displacement vertically or along a z-axis. Various feed screw types of drives are employed for displacing the worktable along the y-axis, the toolhead support assembly along the y-axis and the toolhead assembly along the z-axis. The toolhead assembly includes a base member 30, a C-shaped, depending bracket member 31 pivotally connected to the base member for rotational movement about a vertical or the z-axis, and a tool unit 32 mounted on the lower end of the bracket member and rotatable relative to the bracket about an A-axis displaced 90° relative to the z-axis of the machine. Bracket member 31 includes a first horizontal section 31a pivotally connected to the base member, a vertical section 31b and a second horizontal section 31c spaced below and parallel to horizontal section 31a. Tool unit 32 is supported on and rotational relative to bracket section 31c and includes a pair of coaxially disposed tool holders 33 and 34 provided with a set of tool bits extending in opposite directions along the axis thereof The machine as described operates in a manner whereby several servomotors operated by the controller function to displace table 13 along the x-axis, toolhead support assembly 15 along the y-axis and toolhead assembly 16 along the z-axis, rotate bracket member 31 about the z-axis and tool unit 32 about the A-axis and drive the tool bits of the tool unit to perform a machining function on a workpiece supported on worktable 13. A more detailed description of the construction and operation of a 5-axis machine is provided in U.S. patent application, Ser. No. 08/586,251, filed Jan. 11, 1996 now Pat. 5,808,888.

Dust and other particles produced by the cutting action of the tool bits of the tool unit are removed by a dust collector assembly 40 shown in FIGS. 2 through 7. The assembly includes a first duct member 41 supported on base member 16 of the toolhead assembly and connectable to a vacuum producing source, a second duct member 42 supported on bracket member 31 communicating with first duct member 41 through a slip ring connection 43 and a third duct 44 mounted on tool unit 32 and supported on bracket member 31 and communicating with second duct member 42 through a slip ring connection.

Figure 3:
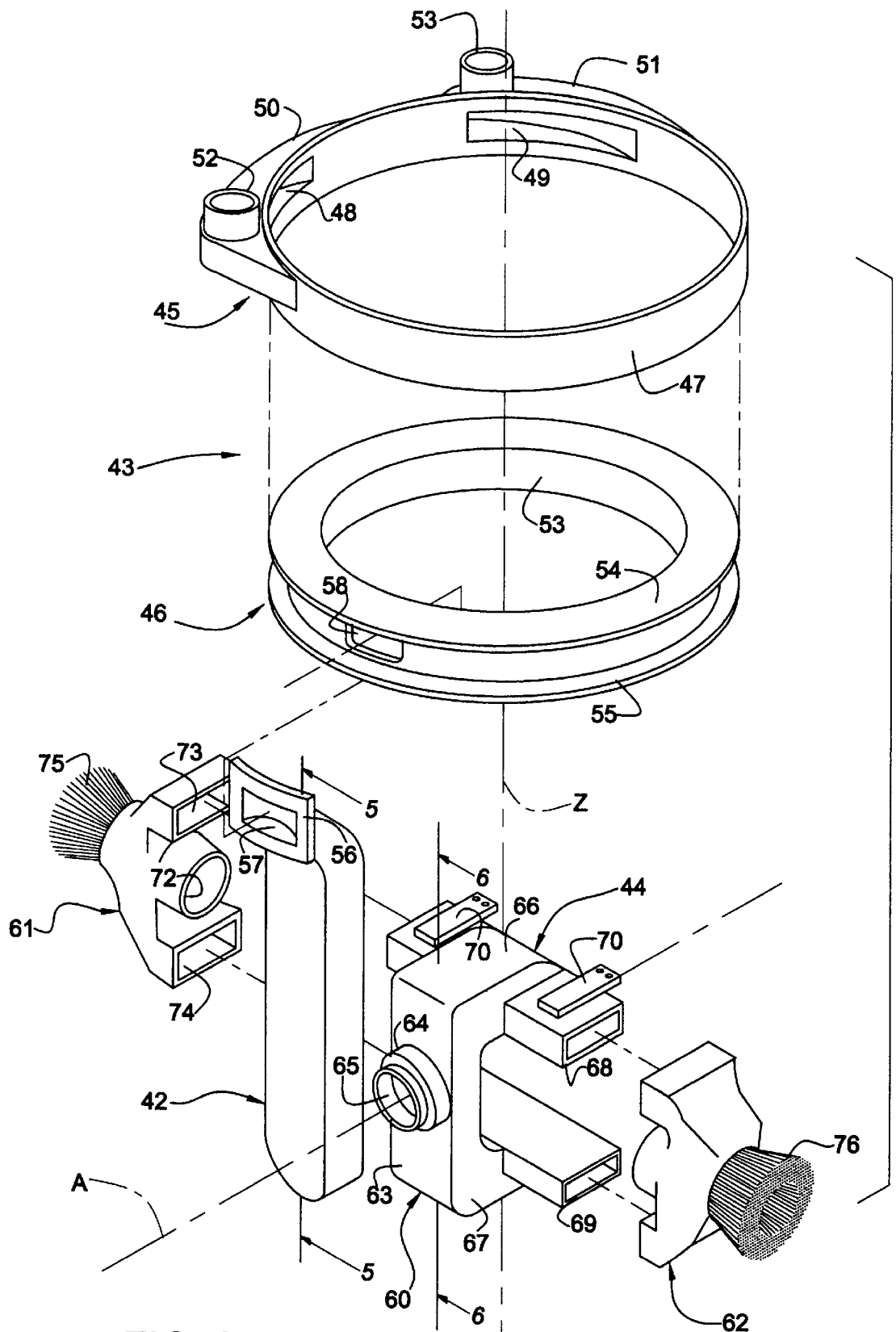
FIG. 3 is a perspective view of the dust collector assembly shown in FIG. 2, illustrating the members thereof in exploded relation.
Figure 4:
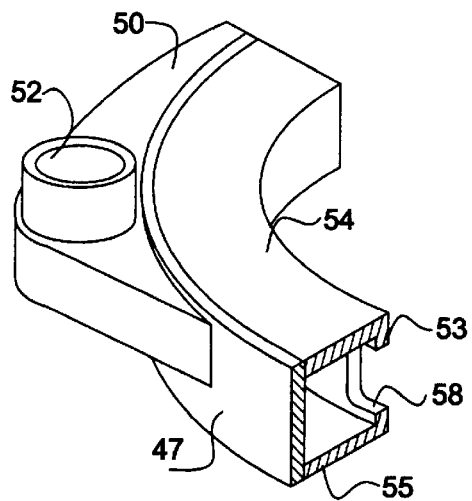
FIG. 4 is a cross-sectional view taken along line 4—4 in FIG. 2.
Figure 5:
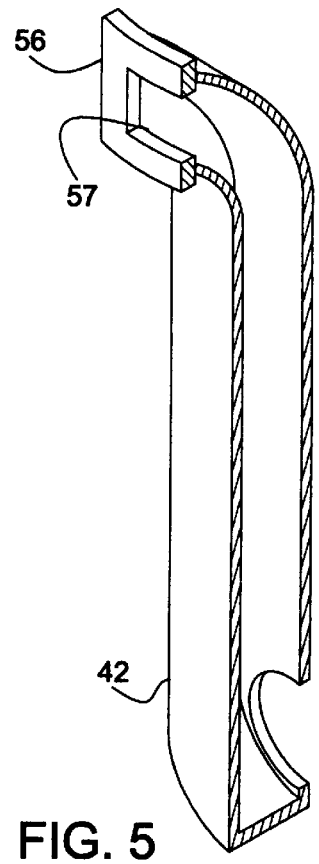
FIG. 5 is a cross-sectional view taken along line 5—5 in FIG. 3.
Figure 6:
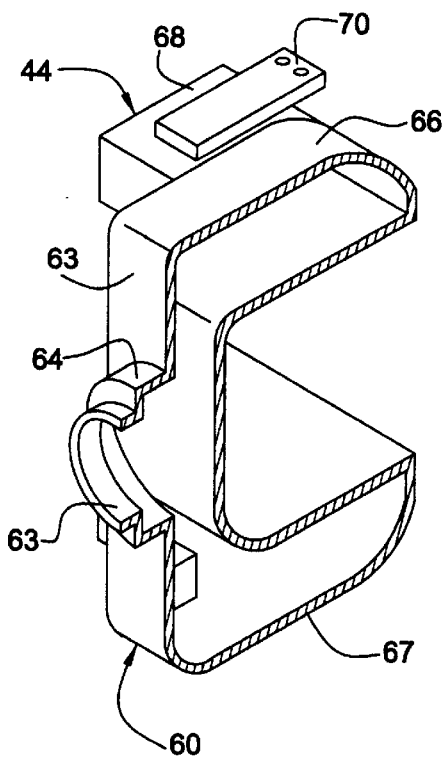
FIG. 6 is a cross-sectional view taken along line 6—6 in FIG. 3.
Figure 7:
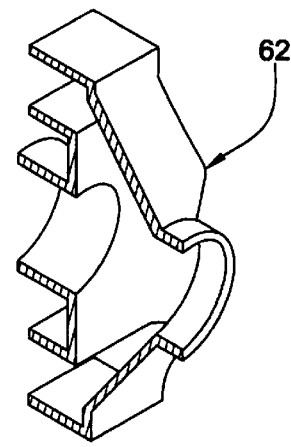
FIG. 7 is a perspective view of a cap section shown in FIG. 3, having a portion thereof broken away.

As best shown in FIGS. 3 and 4, slip ring connection 43 includes a pair of components 45 and 46. Component 45 consists of an annular, outer wall member 47 having a pair of circumferentially spaced openings 48 and 49 communicating with a pair of housing sections 50 and 51 respectively, mounted on the outer surface of member 47. Such housings provide tangentially disposed channels which communicate through outlet ports 52 and 53 with first duct member 41 and a similar duct member also supported on the toolhead assembly and connectable to a vacuum producing source. Component 46 is adapted to be received within coaxially member 47, cooperate with member 47 to provide an annular channel communicating with openings 48 and 49 and rotate relative to member 47 about a common axis. component 46 has a C-shaped cross-sectional configuration and includes an annular, inner wall section 53 adapted to be spaced from and disposed parallel relative to member 47 when component 46 is received within annular outer member 47, and a pair of upper and lower wall sections 54 and 55 which cooperate with annular inner wall section 53 and annular outer wall member 47 to provide the annular channel communicating with openings 48 and 49.

The upper end of duct member 42 is provided with a flange 56 defining an outlet 57, which is rigidly secured to the inner side of inner wall section 53 of component 46 so that outlet opening 57 registers with an opening 58 in wall section 53 to intercommunicate the interior of duct member 42 with the annular channel formed by the insertion of component 46 within component 45. The rigid connection of the upper end of duct member 42 with component 46 not only provides intercommunication between the interior of duct member 42 and the annular channel of the slip ring connection but permits duct member 42 to rotate with component 46 about the z-axis relative to component 45.

Duct member 44 includes a base component 60 and a pair of cap components 61 and 62. Base component 60 includes a base section 63 having a hub portion 64 defining an outlet 65 and a pair of leg sections 66 and 67. The leg sections are provided with a set of spaced, parallel duct segments 68 and 69 communicating with outlet 65 through base end leg sections 63, 66 and 67. Base component 60 is supported on bracket member section 31c by means of a set of connecting strips 70 secured to a mounting bracket 71 (FIG. 1) on the tool unit, and communicates through outlet 65 with an inlet of duct member 42 and is pivotal with tool unit 32 relative to duct member 42 through a slip ring connection of hub portion 64 and a portion of the lower end of duct member 42, about the A-axis. When duct component 60 is mounted on bracket 71, tool unit 32 will be received between leg sections 66 and 67 thereof with the tool holders 33 and 34 and their respective tool bits projecting outwardly beyond the ends of duct segments 68 and 69. Cap components 61 and 62 are substantially identical in configuration. As best shown in FIG. 3, cap section 61 includes a center opening 72 for receiving tool holder 33 therethrough, and a set of channels 73 and 74 which intercommunicate an outer end of opening 72 with the interiors of segments 68 and 69 when the cap component is mounted on the base component. Cap component 61 and 62 further are provided with brushes 75 and 76 each of which are adapted to encompass a tool bit and engage a workpiece being machined to isolate the dust and particles produced by the cutting action of the tool bit.

Figure 2:
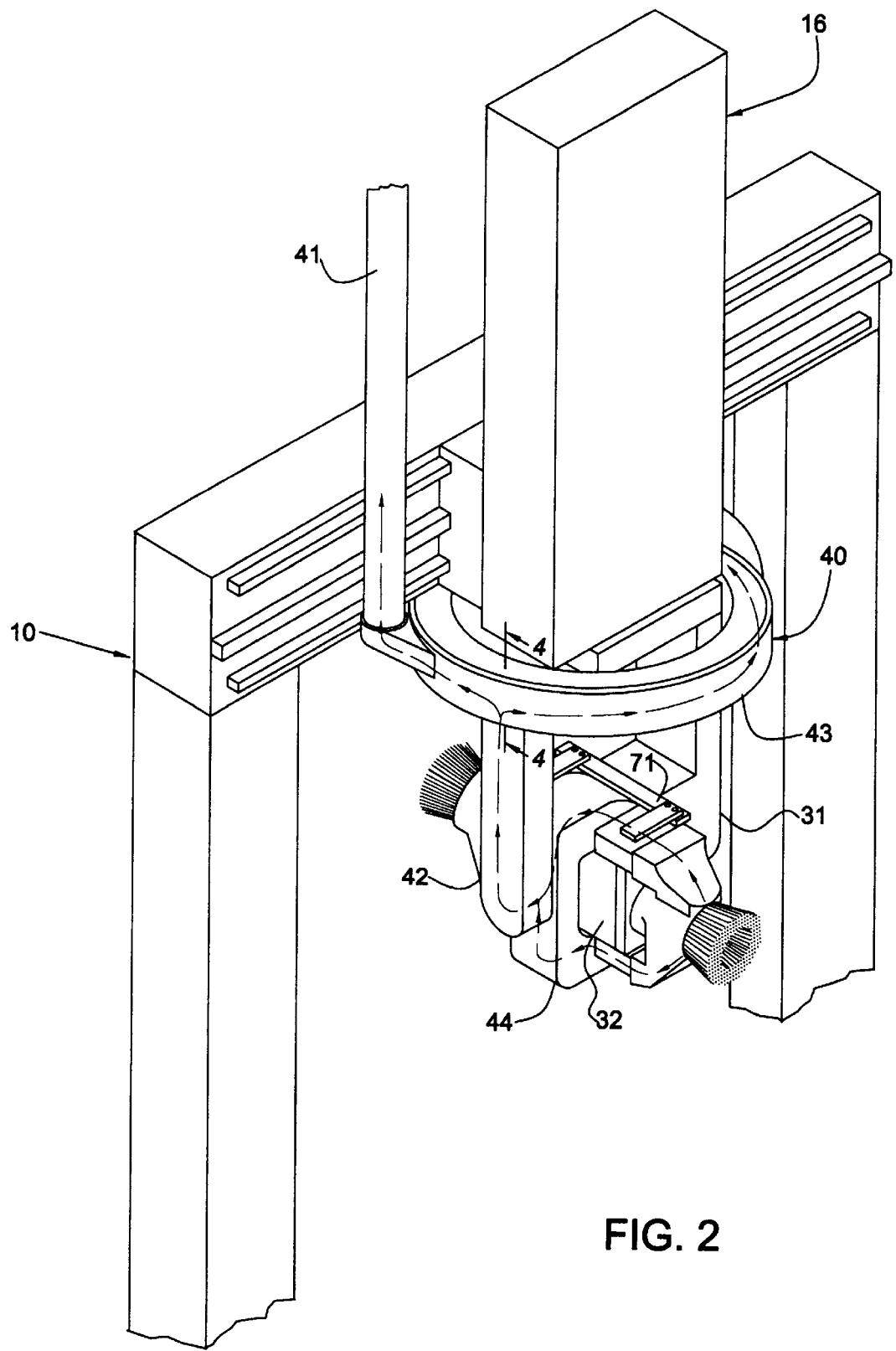
FIG. 2 is a partial, perspective view of the machine shown in FIG. 1, equipped with a dust collector assembly embodying the present invention.

With the dust collector assembly as described mounted on toolhead assembly 16, as shown in FIG. 2, tool unit 32 will be free to pivot about the z-axis by means of slip ring connection 43 and about the A-axis by means of the slip connection between duct member 44 and duct member 42, and a vacuum can be applied to assembly 40 for removing dust and other particles produced by the cutting action of the tool bits during operation. Furthermore, the toolhead assembly will be free to traverse along the x, y and z axes of the machine and rotate about the z and A-axis to permit either of the tool bits to traverse a cutting path in accordance with a selected program executed by the controller.

It is contemplated that the various components of the duct collector assembly be constructed of a molded, lightweight plastic material. It further is contemplated that the components of such assembly be installed on the toolhead assembly simply by attaching component 45 to the base member of the toolhead assembly, attaching duct member 60 to bracket 71 of the tool unit, slipping component 46 with duct member 42 attached thereto up along bracket 31 to position component 46 coaxially within component 45 and then connecting the lower end of duct member 42 to duct component 60 through the slip ring connection therebetween and then mounting cap components 61 and 62 on base components 60 with the tool holders of the tool unit being received within the center openings of the cap components.

The assembly thus formed and installed will be of a sufficient light weight so as not to adversely effect the dynamics of the machine, will permit the tool unit to be freely rotated about the z and A-axes and will effectively remove dust and other particles produced by the cutting action of the tool bits.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof a s limited solely by the appended claims.

We claim:

1. A dust collector assembly for a toolhead assembly of a machine tool, having a base unit, a bracket supported on said base unit and pivotal thereto about a first axis and a tool unit supported on said bracket and pivotal relative thereto about a second axis, comprising:

a first duct supported on said base unit, having an inlet and an outlet communicable with a vacuum producing source;

a second duct support on said bracket, having an inlet and an outlet communicating with the inlet of said first duct through a first slip ring connection disposed coaxial with said first axis; and a third duct supported on said bracket, having an inlet disposed adjacent a tool of said tool unit and an outlet communicating with the inlet of said second duct through a second slip ring connection disposed coaxially with said second axis.

2. A dust collector assembly according to claim 1 wherein first slip ring connection includes upper and lower annual wall members and inner and outer annular wall members defining a closed annular channel, one of said wall members being rigidly connected to said first duct and having an opening intercommunicating said closed, annular channel and the interior of said first duct, and another of said wall members being rigidly connected to said second duct and having an opening intercommunicating said closed, annular channel and the interior of said second duct.

3. A dust collector assembly according to claim 1 wherein said first slip ring connection includes a first component an annular, outer side wall member and a second component including upper and lower, annular wall members and an annular, inner side wall member connecting said upper and lower wall members to form a component having a C-shaped cross-sectional configuration, received within said first component to form a closed annular channel, one of said components being rigidly connected to said first duct and having an opening intercommunicating said closed annular channel and the interior of said first duct, and the other of said components being rigidly connected to said second duct and having an opening intercommunicating said closed annular channel and the interior of said second duct.

4. A dust collector assembly according to claim 3 wherein said first component is connected to said first duct, and said second component is connected to said second duct.

5. A dust collector assembly according to claim 4 wherein said second duct is connected to said annular inner wall of said second component.

6. A dust collector assembly according to claim 4 wherein said first duct is connected to said annular outer wall member comprising said first component.

7. A dust collector assembly according to claim 4 including means disposed on said annular outer wall member comprising said first component, defining a channel disposed tangentially relative to said annular channel, intercommunicating said annular channel and the inlet of said first duct.

8. A dust collector assembly according to claim 1 wherein said third duct is provided with at least one cap component including said inlet opening of said third duct.

9. A dust collector assembly according to claim 1 wherein said third duct member includes a unshaped component having a base section disposed substantially perpendicular to the axis of rotation of said second slip ring connection, and a pair of leg sections disposed substantially parallel to the axis of rotation of said second slip ring connection.

10. A dust collector assembly according to claim 1 wherein said ducts and slip ring connections are formed of a molded, lightweight plastic material.

* * * * *